(12) United States Patent
Gattere et al.

(10) Patent No.: US 11,015,933 B2
(45) Date of Patent: May 25, 2021

(54) MICROMECHANICAL DETECTION STRUCTURE FOR A MEMS SENSOR DEVICE, IN PARTICULAR A MEMS GYROSCOPE, WITH IMPROVED DRIVING FEATURES

(71) Applicant: STMicroelectronics S.r.l., Agrate Brianza (IT)

(72) Inventors: Gabriele Gattere, Castronno (IT); Luca Giuseppe Falorni, Limbiate (IT); Carlo Valzasina, Gessate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 31 days.

(21) Appl. No.: 16/664,041

(22) Filed: Oct. 25, 2019

(65) Prior Publication Data
US 2020/0064134 A1 Feb. 27, 2020

Related U.S. Application Data

(63) Continuation of application No. 15/454,907, filed on Mar. 9, 2017, now Pat. No. 10,458,794.

(30) Foreign Application Priority Data

Mar. 9, 2016 (IT) .................. 102016000024696

(51) Int. Cl.
*G01C 19/5712* (2012.01)
(52) U.S. Cl.
CPC ................ *G01C 19/5712* (2013.01)

(58) Field of Classification Search
CPC ................................. G01C 19/5712
See application file for complete search history.

(56) References Cited

U.S. PATENT DOCUMENTS

| 6,189,381 B1 * | 2/2001 | Huang | G01C 19/5656 |
| | | | 73/504.12 |
| 7,222,533 B2 * | 5/2007 | Mao | G01C 19/5712 |
| | | | 73/504.04 |
| 9,688,527 B2 * | 6/2017 | Frey | B81B 3/0027 |

(Continued)

FOREIGN PATENT DOCUMENTS

| CN | 102712460 A | 10/2012 |
| CN | 103213934 A | 7/2013 |
| EP | 2 884 229 A1 | 6/2015 |

*Primary Examiner* — David J Bolduc
(74) *Attorney, Agent, or Firm* — Seed Intellectual Property Law Group LLP

(57) ABSTRACT

A micromechanical detection structure includes a substrate of semiconductor material and a driving-mass arrangement is coupled to a set of driving electrodes and driven in a driving movement following upon biasing of the set of driving electrodes. A first anchorage unit is coupled to the driving-mass arrangement for elastically coupling the driving-mass arrangement to the substrate at first anchorages. A driven-mass arrangement is elastically coupled to the driving-mass arrangement by a coupling unit and designed to be driven by the driving movement. A second anchorage unit is coupled to the driven-mass arrangement for elastically coupling the driven-mass arrangement to the substrate at second anchorages. Following upon the driving movement, the resultant of the forces and of the torques exerted on the substrate at the first and second anchorages is substantially zero.

20 Claims, 8 Drawing Sheets

(56) References Cited

U.S. PATENT DOCUMENTS

| | | | |
|---|---|---|---|
| 10,267,822 B2* | 4/2019 | Wu | G01C 19/5769 |
| 2007/0214883 A1* | 9/2007 | Durante | G01C 19/5712 |
| | | | 73/504.04 |
| 2009/0064780 A1* | 3/2009 | Coronato | G01P 15/14 |
| | | | 73/504.08 |
| 2010/0024547 A1 | 2/2010 | Katsuki et al. | |
| 2010/0058863 A1* | 3/2010 | Classen | G01C 19/5712 |
| | | | 73/504.12 |
| 2010/0126269 A1* | 5/2010 | Coronato | G01C 19/5712 |
| | | | 73/504.04 |
| 2010/0154541 A1* | 6/2010 | Cazzaniga | G01C 19/5712 |
| | | | 73/504.12 |
| 2010/0253437 A1 | 10/2010 | Seeger et al. | |
| 2010/0307244 A1* | 12/2010 | Rocchi | G01P 15/0802 |
| | | | 73/504.12 |
| 2011/0023604 A1* | 2/2011 | Cazzaniga | G01C 19/5712 |
| | | | 73/514.32 |
| 2011/0041603 A1 | 2/2011 | Pruetz | |
| 2012/0006123 A1* | 1/2012 | Walther | G01C 19/5712 |
| | | | 73/774 |
| 2013/0174661 A1 | 7/2013 | Kuhlmann et al. | |
| 2013/0298670 A1* | 11/2013 | Tsugai | G01C 19/5705 |
| | | | 73/504.12 |
| 2014/0374849 A1* | 12/2014 | Lin | G01C 19/574 |
| | | | 257/415 |
| 2015/0114112 A1* | 4/2015 | Valzasina | G01C 19/56 |
| | | | 73/504.12 |
| 2016/0231115 A1* | 8/2016 | Piirainen | G01C 19/5747 |
| 2017/0284804 A1* | 10/2017 | Gattere | G01C 19/5747 |
| 2017/0341927 A1* | 11/2017 | Pekka Herzogenrath | |
| | | | G01C 19/5656 |
| 2018/0031603 A1* | 2/2018 | Huang | G01P 15/14 |
| 2018/0188028 A1* | 7/2018 | Jeong | G01P 15/0802 |
| 2018/0306580 A1* | 10/2018 | Gattere | G01C 19/5755 |
| 2019/0072389 A1* | 3/2019 | Prati | G06F 12/0817 |
| 2020/0124418 A1* | 4/2020 | Blomqvist | G01C 19/5733 |

* cited by examiner

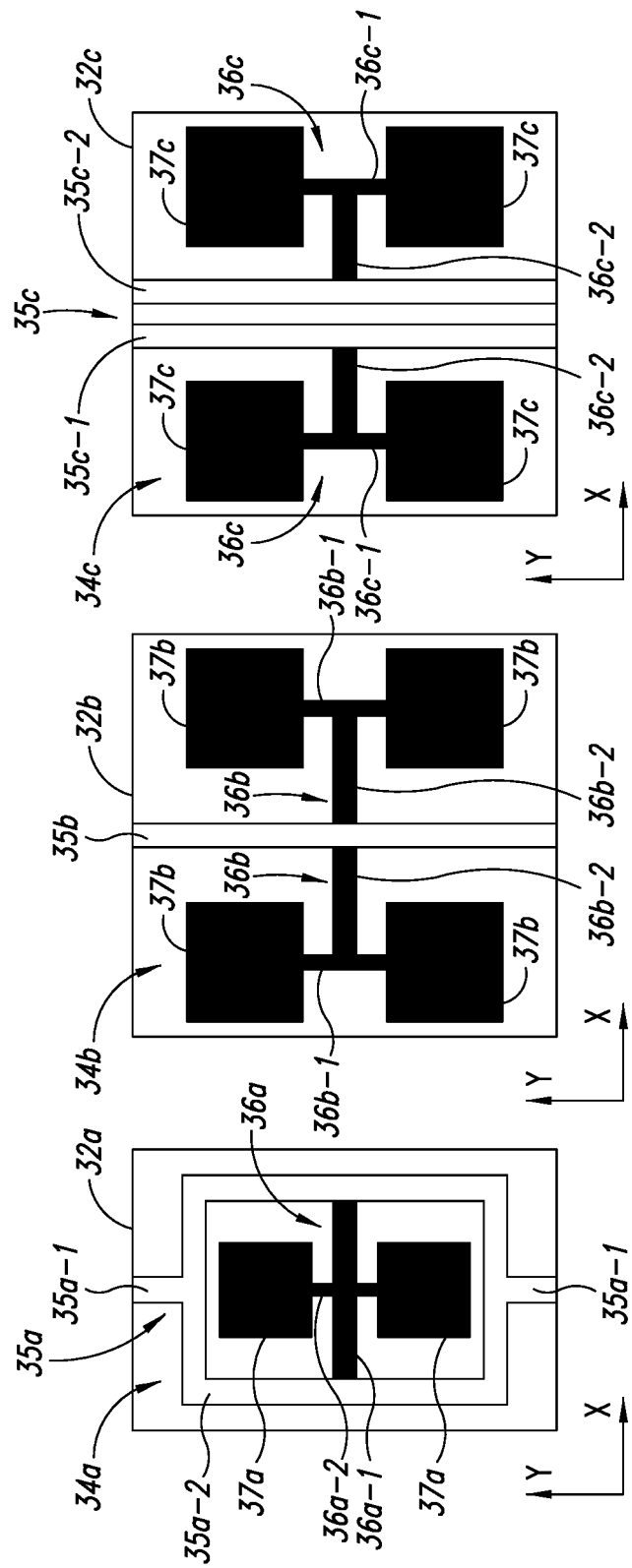

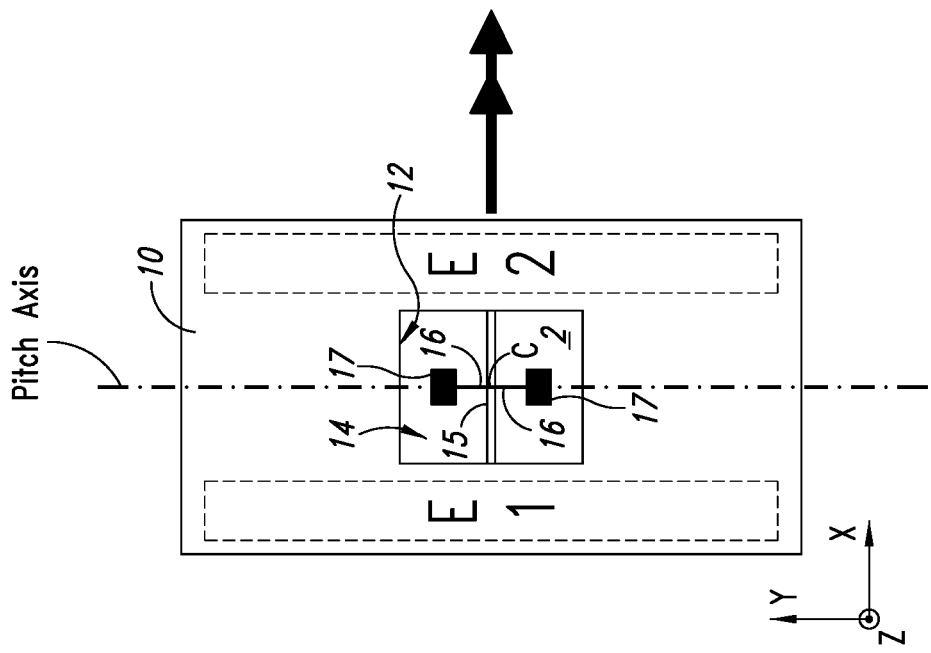
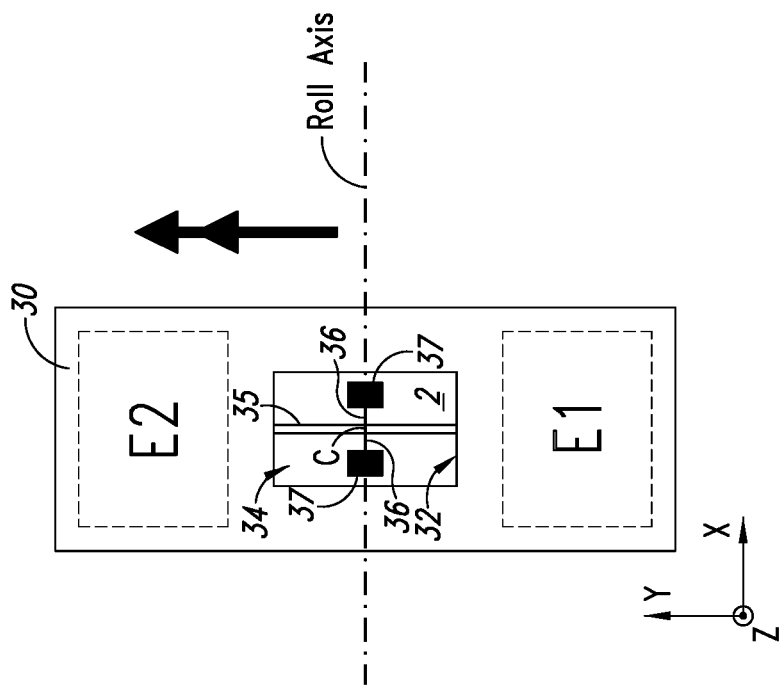

MICROMECHANICAL DETECTION STRUCTURE FOR A MEMS SENSOR DEVICE, IN PARTICULAR A MEMS GYROSCOPE, WITH IMPROVED DRIVING FEATURES

BACKGROUND

Technical Field

The present disclosure relates to a micromechanical detection structure for a MEMS (Micro-Electro-Mechanical System) sensor device with improved driving features. In particular, the following discussion will make reference, without this implying any loss of generality, to use of the micromechanical detection structure in a MEMS gyroscope.

Description of the Related Art

As is known, micromachining techniques enable manufacturing of micromechanical structures within layers of semiconductor material, which have been deposited (for example, a polycrystalline-silicon layer) or grown (for example, an epitaxial layer) on sacrificial layers, which are removed via chemical etching.

Inertial sensors, for instance, accelerometers and gyroscopes, made with this technology are used successfully, for example, in the automotive field, in inertial navigation, or in the field of portable devices.

In particular, integrated gyroscopes of semiconductor material made with MEMS technology are known, which are referred to hereinafter as MEMS gyroscopes.

These MEMS gyroscopes operate on the basis of the principle of relative accelerations, exploiting Coriolis acceleration. When an angular velocity is applied to a mobile mass that is driven in a linear direction, the mobile mass is subject to an apparent force, or Coriolis force, which determines a displacement thereof in a direction perpendicular to the linear driving direction and to the axis about which the angular velocity is applied.

The mobile mass is supported above a substrate via elastic elements that enable driving thereof in the driving direction and displacement in the direction of the apparent force, which is directly proportional to the angular velocity.

The displacement of the mobile mass may, for example, be detected via a capacitive transduction system, determining the variations of capacitance between mobile electrodes, which are fixed with respect to the mobile mass, and fixed electrodes, which are fixed with respect to the substrate.

There is a need for improved structures for inertial sensors, such as MEMS gyroscopes, and for improved methods of forming such structures.

BRIEF SUMMARY

Embodiments of the present disclosure provide detection structures of MEMS sensor devices, in particular of a MEMS gyroscope, having improved mechanical and electrical characteristics.

BRIEF DESCRIPTION OF THE SEVERAL VIEWS OF THE DRAWINGS

For a better understanding of the present solution, preferred embodiments thereof are now described, purely by way of non-limiting example, with reference to the attached drawings, wherein:

FIGS. 8A-8C are top plan views of additional embodiments of the coupling units of FIG. 5;

FIGS. 9A and 9b are top views of the driven masses of FIG. 5 showing the positioning of electrodes beneath of each of the driven masses;

DETAILED DESCRIPTION

Figure 1:
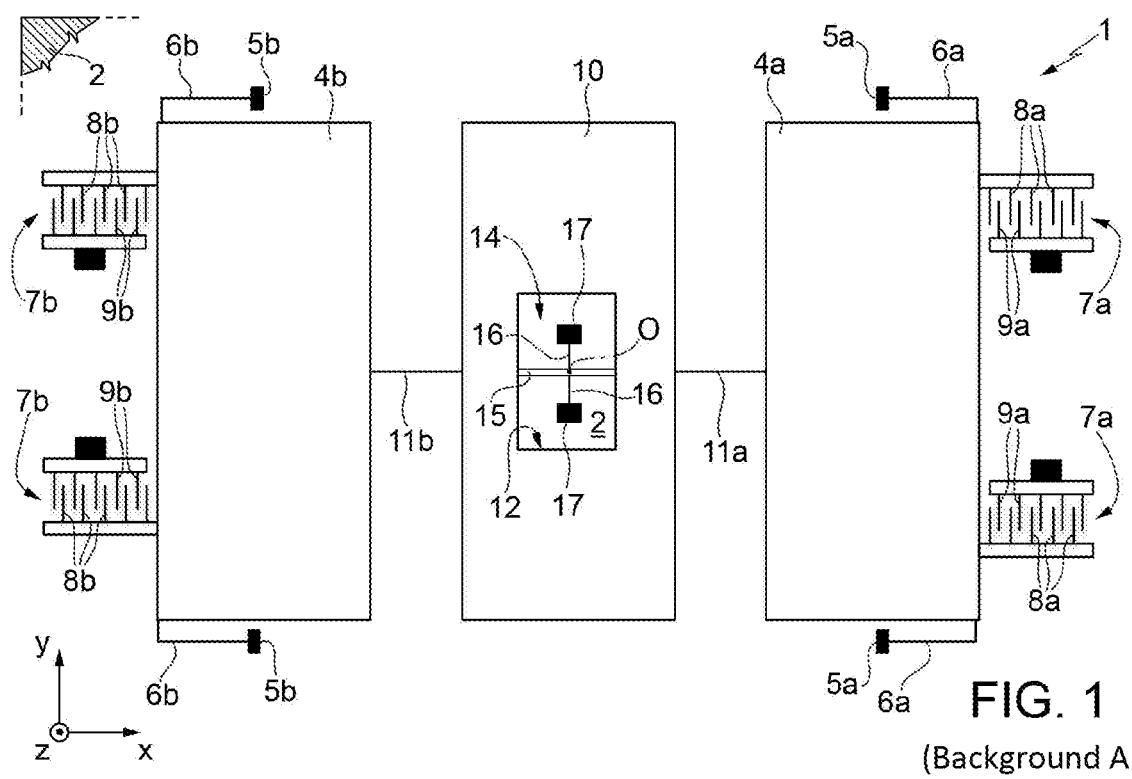
FIG. 1 is a schematic top plan view of a micromechanical detection structure of a MEMS sensor device, of a known type.

FIG. 1 is a schematic representation of a micromechanical detection structure of a MEMS gyroscope, which is designated by 1 and is made in a die of semiconductor material, for example silicon, including a substrate 2.

The detection structure 1 has a substantially planar configuration with a main dimension or extension in a horizontal plane xy, defined by a first horizontal axis x and a second horizontal axis y, orthogonal to one another, and substantially parallel to the plane of the substrate 2, and a minor size, dimension, or extension with respect to the aforesaid main extension, in a direction parallel to a vertical axis z, which forms, with the first and second horizontal axes x, y, a set of three orthogonal axes.

The detection structure 1 comprises a first driving mass 4a and a second driving mass 4b, which have dimensions in or extend in the horizontal plane xy (purely by way of example, substantially rectangular), and are connected to respective anchorages 5a, 5b, fixed with respect to the substrate 2, by elastic anchorage elements 6a, 6b. The driving masses 4a, 4b are suspended over the substrate 2, parallel to the same substrate 2 in a resting condition.

A respective set of driving electrodes 7a, 7b is associated with each driving mass 4a, 4b. Each set of driving electrodes 7a, 7b comprises a respective plurality of mobile electrodes 8a, 8b, which are fixed with respect to the respective driving mass 4a, 4b and extend externally to the driving mass 4a, 4b; and a respective plurality of fixed electrodes 9a, 9b, which are fixed with respect to the substrate 2 and are comb-fingered with the mobile electrodes 8a, 8b.

Suitable electrical biasing signals from an electronic circuit (not illustrated herein) for driving the MEMS gyroscope, determine, by mutual and alternating electrostatic attraction of the electrodes, an oscillatory driving movement of the driving masses 4a, 4b in a linear driving direction, in the example along the second horizontal axis y. In particular, the first and second driving masses 4a, 4b are driven in opposite senses of the driving direction, as indicated by the arrows in FIG. 2 described hereinafter.

The elastic anchorage elements 6a, 6b are thus configured to be compliant with respect to this driving movement.

The detection structure 1 further comprises a driven mass 10, arranged between the first and second driving masses 4a, 4b (in the direction of the first horizontal axis x), and connected to the driving masses 4a, 4b by elastic connection elements 11a, 11b. Also the driven mass 10 is suspended above the substrate 2, parallel thereto in the resting condition.

The driven mass 10 has a main dimension or extension in the horizontal plane xy, for example with a rectangular shape, and centrally defines an empty space 12, the center O of which coincides with the centroid and the center of symmetry of the entire structure.

A coupling unit 14 is arranged within the empty space 12, configured for elastic coupling and anchoring of the driven mass 10 to the substrate 2.

In particular, the coupling unit 14 comprises a rigid element 15, in the example having a rectilinear dimension or extension along the first horizontal axis x, arranged at the center of the empty space 12, elastically connected to the driven mass 10 by elastic elements (not shown), and further connected, by respective elastic connection elements 16 which have, in the example, a linear dimension or extension along the second horizontal axis y to central anchorage elements 17.

Figure 2:
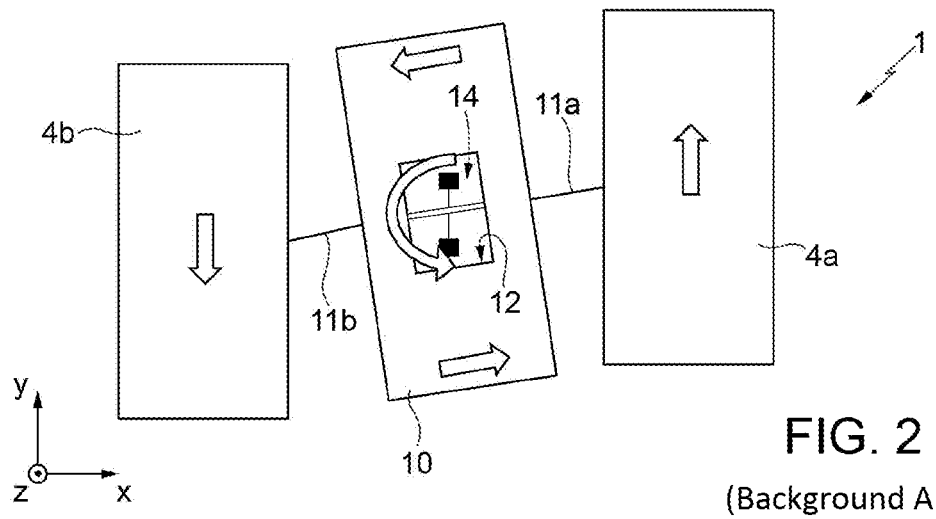
FIG. 2 shows the detection structure of FIG. 1, whose driving movements have been highlighted.

In use, and as shown schematically in FIG. 2 (where the detection structure 1 is shown once again schematically for clarity of illustration), the coupling unit 14 is configured to enable rotation of the driven mass 10 in the plane of the sensor xy (with respect to the substrate 2) about the vertical axis z, in response to the driving movement in opposite directions of the driving masses 4a, 4b (as represented by the arrows). Basically, the driven mass 10 is drawn in rotation, in the example in the counterclockwise direction, by the movement of the driving masses 4a, 4b.

In response to the driving movement and in the presence of an angular velocity acting about the first horizontal axis x, a Coriolis force is generated on the driving masses 4a, 4b directed along the vertical axis z, which causes a respective rotation of the same driving masses 4a, 4b out of the plane of the sensor xy, in the example about the second horizontal axis y. Suitable electrodes arranged on the substrate 2, underneath the driving masses 4a, 4b (here not illustrated) enable, by capacitive coupling with the same driving masses 4a, 4b, detection of a quantity indicative of the value of the angular velocity about the first horizontal axis x (which thus constitutes a first detection axis for the MEMS gyroscope).

In a substantially similar way, in response once again to the driving movement and in the presence of an angular velocity acting about the second horizontal axis y, a Coriolis force is generated on the driven mass 10 directed along the vertical axis z, which causes a respective rotation thereof out of the plane of the sensor xy, in the example about the first horizontal axis x. Once again, suitable electrodes arranged on the substrate 2, underneath the driven mass 10 (here not illustrated) enable, by capacitive coupling with the same driven mass 10, detection of a quantity indicative of the value of the angular velocity acting about the second horizontal axis y (which thus constitutes a second detection axis for the MEMS gyroscope).

While the detection structure 1 is advantageous from numerous points of view, the structure may result in undesirable cross-talk between detection structures during electrical testing thereof (when they are coupled to a same testing structure). There may also be vibrations induced in a corresponding package due to the driving movement and oscillations and instability of the zero level of the MEMS sensor device (the so-called ZRL—Zero-Rate Level). Moreover, the detection structure 1 may have a non-zero sensitivity to undesirable external stresses and vibrations that lead to rotational accelerations about the vertical axis z.

As will be clarified hereinafter, the present solution stems from the realization, by the present Applicant, that the problems highlighted previously are in general due to a non-zero resultant of the forces and of the torques exerted by inertial effect on the substrate (and thus on the corresponding package) by the moving masses (driving masses and driven masses) at the corresponding anchorages, as a result of the driving movement.

In particular, referring to FIG. 2, in the detection structure 1 of a known type a torque is generated on the substrate 2 at the coupling unit 14, due to rotation of the driven mass 10 about the vertical axis z.

The present Applicant has realized that the aforesaid torque, transmitted to the substrate 2 and to the package, causes, for example, undesirable couplings with other detection structures during electrical-testing operations, or in general undesirable disturbance effects.

Figure 3:
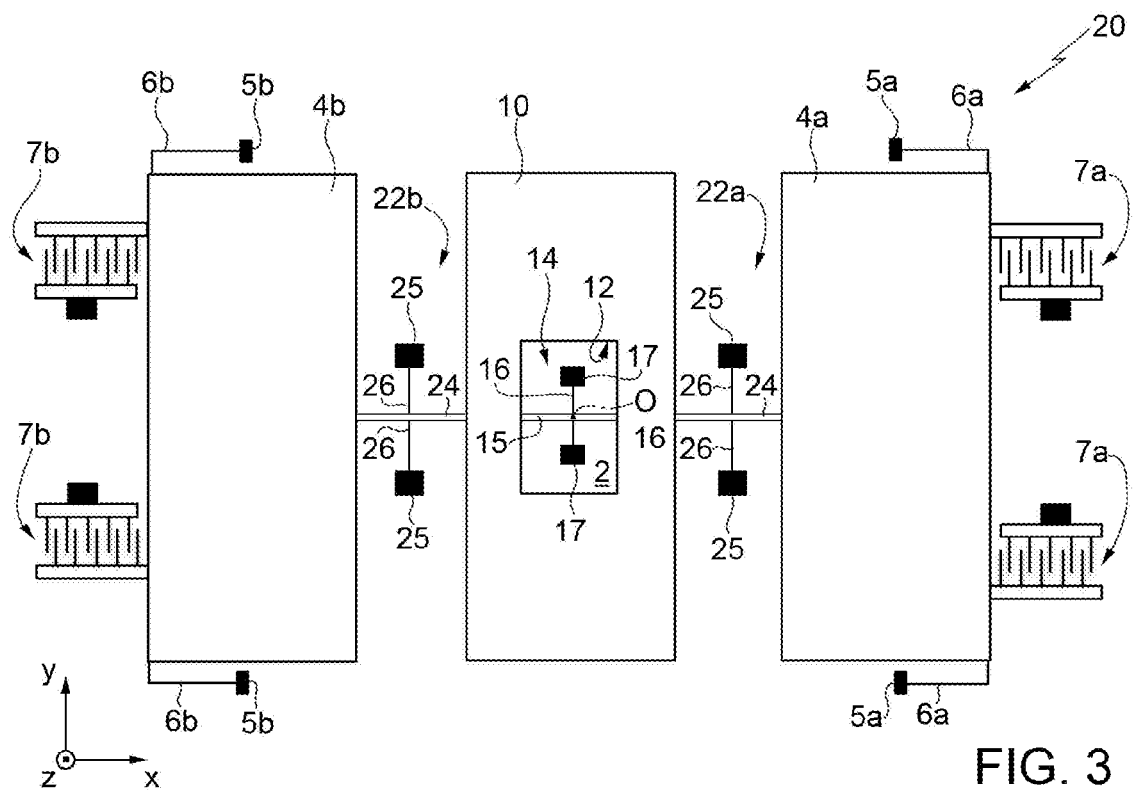
FIG. 3 is a schematic top plan view of a micromechanical detection structure of a MEMS sensor device according to a first embodiment of the present disclosure.

A particular aspect of the present solution thus envisages, as will be described in detail, first with reference to FIG. 3, providing a detection structure, designated by 20, in which the arrangement and configuration of the driving/driven masses and of the corresponding elastic elements for coupling and anchorage to the substrate 2, as well as the direction of the corresponding driving movements, are such as to originate a substantially and ideally zero resultant of the forces and of the torques exerted on the substrate 2 at the corresponding anchorages.

In other words, the inertial effects of the various mobile masses on the substrate 2, in terms of forces and torques, are such as to compensate one another.

In detail, in a first embodiment, the detection structure 20 is substantially equivalent to the detection structure 1 of FIG. 1 (elements that are similar are thus not described again herein and are designated by the same reference numbers), with the difference that it includes a first coupling element 22a and a second coupling element 22b, which elastically couple the driven mass 10 to the first driving mass 4a and to the second driving mass 4b, respectively.

These coupling elements 22a, 22b are configured to generate on the substrate 2 a torque such as to substantially compensate the torque due to rotation of the driven mass 10. The resultant of the torques is thus substantially zero as a result of the driving movement. These coupling elements 22a, 22b cause in particular reversal of the velocity or driving direction of the driven mass 10, with respect to the traditional solution, described with reference to FIG. 2.

Each coupling element 22a, 22b is configured to define a rigid connection element 24 having a first end connected to the driven mass 10 and a second end connected to the respective driving mass 4a, 4b, so as to define a respective hinged coupling (via respective elastic hinge elements, not illustrated herein).

The rigid connection element 24 has a longitudinal dimension or extension, in the example along the first horizontal axis x, at rest. The aforesaid rigid connection element 24, which may ideally be considered as having infinite stiffness to bending, has, in an intermediate portion thereof between the driven mass 10 and the respective driving mass 4a, 4b, for example at a central portion thereof, a point of constraint to the substrate 2 (which is forced, that is, to remain substantially immobile to translation during movement of the driving masses 4a, 4b). In particular, the aforesaid intermediate portion is hinged to the substrate 2 of the detection structure 20 at the aforesaid point of constraint, in the example by a pair of respective anchorages 25 to which the aforesaid intermediate portion is connected via respective elastic hinge elements 26.

The rigid connection element 24 is thus ideally hinged at the center to the substrate 2, and, at its ends, to the driven mass 10 and to the respective driving mass 4a, 4b, consequently operating substantially as a rocker arm (or as a lever with a central fulcrum).

Figure 4:
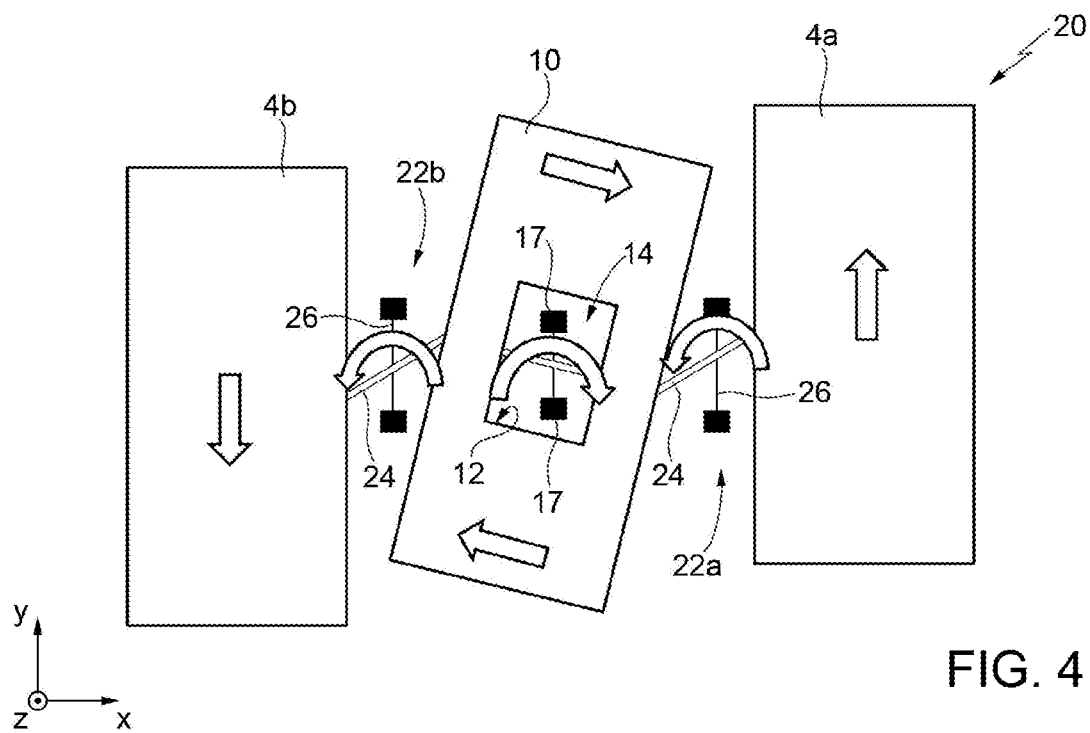
FIG. 4 shows the detection structure of FIG. 3, whose driving movements have been highlighted.

During operation, as shown schematically in FIG. 4, the rigid connection element 24 is free to rotate in the horizontal plane xy about the central point of constraint, but not to translate. Consequently, the driving movement of the driving masses 4a, 4b in opposite senses of the driving direction (in the example, along the second horizontal axis y) leads in this case to a rotation in a clockwise direction of the driven mass 10 (i.e., in a direction opposite to that of the known solution of FIG. 1).

In particular, as highlighted in the aforesaid FIG. 4, the coupling elements 22a, 22b are configured to exert on the substrate 2, at the respective central constraint, a total torque (in a counterclockwise direction, in the example) equal and opposite to the torque (in a clockwise direction, in the example) exerted on the same substrate 2 by the coupling unit 14 of the driven mass 10 at the central anchorage elements 17, due to rotation of the same driven mass 10 about the vertical axis z.

Furthermore, in this embodiment, the resultant of the forces exerted on the anchorages 5a, 5b on account of the driving movement of the driving masses 4a, 4b is substantially zero, in so far as the forces exerted by the individual driving masses 4a, 4b are substantially compensated (given that the respective driving movements are opposite to one another in the driving direction).

Thus, advantageously, both the resultant of the forces and the resultant of the torques that act on the substrate 2 are substantially zero.

In a way that will be evident from what has been discussed, the mechanical characteristics (for example, in terms of the inertial masses and of the stiffnesses of the elastic elements) of the driven mass 10, of the driving masses 4a, 4b, and of the respective elements for coupling and anchorage to the substrate 2 are designed so as to ensure substantial equivalence, and thus mutual compensation, of the forces and torques generated in opposite directions, and substantial cancelling-out of the resultant of forces and torques acting on the substrate 2.

In a possible embodiment, each of the elastic hinge elements previously defined may comprise a respective pair of springs, which have a longitudinal dimension or extension (for example, along the second horizontal axis y) and are set as prolongation of one another starting from the respective hinge point.

Figure 5:
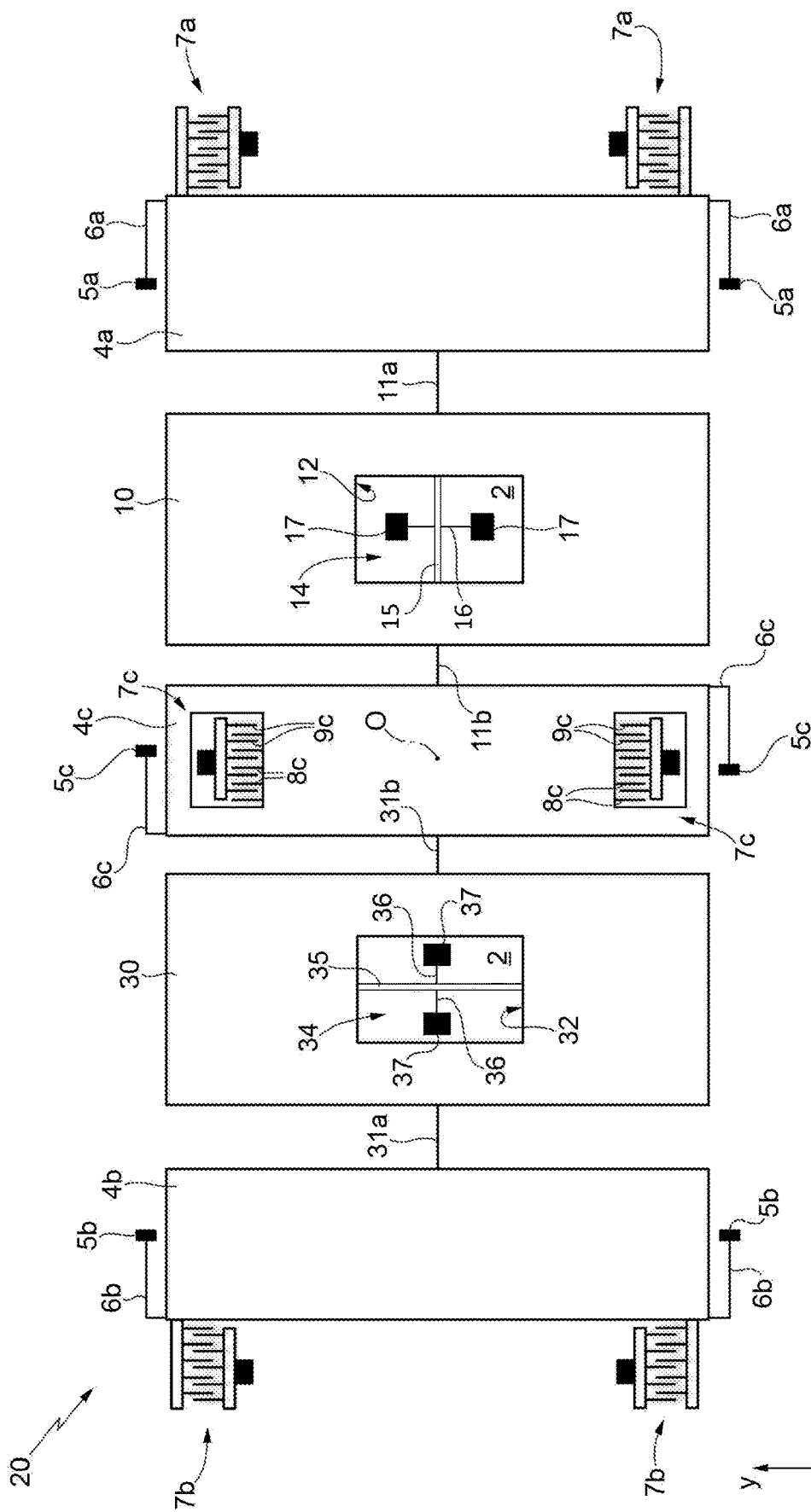
FIG. 5 is a schematic top plan view of a micromechanical detection structure of a MEMS sensor device according to a second embodiment of the present disclosure.

With reference to FIG. 5, a description of a second embodiment of the present solution is now presented, envisaging a different arrangement of the driving/driven masses and of the corresponding elastic elements for coupling and anchorage to the substrate 2, such as to originate once again a substantially zero resultant of the forces and torques exerted on the same substrate 2 at the corresponding anchorages.

In particular, in this second embodiment, the detection structure, once again designated by 20, comprises a third driving mass 4c, in the example substantially rectangular, having dimensions or extending in the horizontal plane xy, and connected to respective anchorages 5c, fixed with respect to the substrate 2, by respective elastic anchorage elements 6c. The third driving mass 4c is suspended above the substrate 2, parallel to the same substrate 2 in the resting condition.

The third driving mass 4c is arranged between the first and second driving masses 4a, 4b along the first horizontal axis x. A geometrical center O of the third driving mass 4c in this case represents the centroid and center of symmetry of the detection structure 20.

A respective set of driving electrodes 7c is associated with the third driving mass 4c, comprising a respective plurality of mobile electrodes 8c, fixed with respect to the same third driving mass 4c, as well as a respective plurality of fixed electrodes 9c fixed with respect to the substrate 2 and comb-fingered with the mobile electrodes 8c.

Appropriate electrical biasing signals from the electronic circuit (not illustrated) for driving the MEMS gyroscope, determine, by mutual and alternating electrostatic attraction of the electrodes, a respective driving movement of the third driving mass 4c in a linear driving direction, in the example along the second horizontal axis y.

Figure 6:
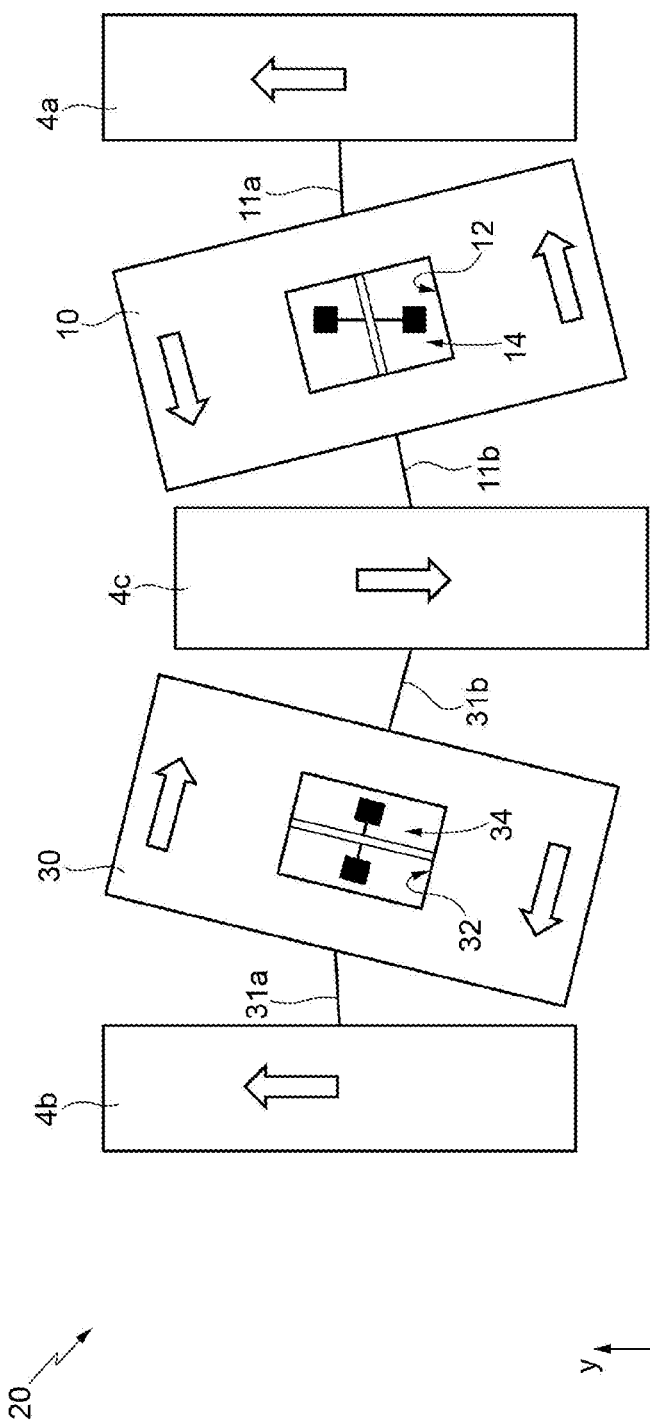
FIG. 6 shows the detection structure of FIG. 5, whose driving movements have been highlighted.

In particular, in this embodiment, as represented by the arrows in the next FIG. 6, the first and second driving masses 4a, 4b are driven in the same sense of the driving direction, whereas the third driving mass 4c is driven in the opposite sense of the same driving direction.

The detection structure 20 in this case comprises a pair of driven masses (suspended above the substrate 2, parallel thereto in the resting condition), and in particular a first driven mass, designated once again by 10, arranged between the first and third driving masses 4a, 4c (in the direction of the first horizontal axis x), and connected to the same driving masses 4a, 4c by elastic connection elements 11a, 11b (for example, of a linear type); and a second driven mass 30, arranged between the second and third driving masses 4b, 4c (in the direction of the first horizontal axis x), and connected to the same driving masses 4b, 4c by respective elastic connection elements 31a, 31b (which are also, for example, of a linear type).

Each driven mass 10, 30 has a main dimension or extension in the horizontal plane xy, with a shape that is for example rectangular, and defines at the center an empty space 12, 32, arranged inside which is a respective coupling unit 14, 34 configured for elastic coupling and anchorage of the respective driven mass 10, 30 to the substrate 2.

Each coupling unit 14, 34 comprises a rigid element 15, 35 arranged at the center of the empty space 12, 32, elastically connected to the respective driven mass 10, 30, and further elastically connected to central anchorage elements 17, 37 by respective elastic connection elements 16, 36, which have, in the illustrated example, a linear dimension or extension, as will now be described in more detail.

In particular, in the example illustrated in FIG. 5, the elastic connection elements 16 associated with the first driven mass 10 have a linear dimension or extension along the second horizontal axis y, whereas the elastic connection elements 36 associated with the second driven mass 30 have a linear dimension or extension along the first horizontal axis x (given that they are further configured so as to enable rotations of the same driven masses 10, 30 upon detection of respective angular velocities). Furthermore, in the same example of FIG. 5, the rigid element 15 coupled to the first driven mass 10 has a linear dimension or extension along the first horizontal axis x, whereas the rigid element 35 coupled to the second driven mass 30 has a linear dimension or extension along the second horizontal axis y.

During operation, as shown in FIG. 6, in response to the driving movement, the first and second driven masses 10, 30 perform rotations in opposite directions (in the example, the first driven mass 10 in the counterclockwise direction and the second driven mass 30 in the clockwise direction) in the plane of the sensor xy, with respect to the substrate 2 and about the vertical axis z.

Consequently, on the substrate 2 a substantially zero resultant torque is generated due to rotation of the driven masses 10, 30, in so far as at the respective coupling units 14, 34 and the respective central anchorage elements 17, 37 torques are generated having substantially the same value but oriented in opposite directions, thus compensating one another.

Once again, in fact, the mechanical characteristics (for example, in terms of inertial masses and stiffnesses) of the driven masses 10, 30 and of the respective coupling units 14, 34 are designed to obtain the aforesaid substantial equivalence of the torques generated in opposite directions, and substantial cancelling-out of the resultant torque on the substrate 2.

Also in this case, the resultant of the forces exerted on the anchorages 5a, 5b, 5c on account of the driving movement of the driving masses 4a, 4b, 4c is substantially zero, in so far as the forces exerted by the individual driving masses 4a, 4b, 4c (in a first sense of the driving direction for the first and second driving masses 4a, 4b, and in a second sense of the same driving direction for the third driving mass 4c) are substantially compensated, once again thanks to the appropriate sizing of the mechanical characteristics of the driving masses 4a, 4b and 4c and of the corresponding coupling and anchorage elastic elements.

In this case, the detection movements are performed by the first and second driven masses 10, 30, which are able to turn, as a result of the Coriolis forces that are generated due to the driving movement, for example about the first horizontal axis x and the second horizontal axis y, respectively.

The advantages of the solution proposed are clear from the foregoing description.

In any case, it is emphasized once again that the present solution enables provision of micromechanical detection structures, in particular for MEMS sensor devices, for example MEMS gyroscopes, with a substantially zero resultant of the forces and of the torques acting on the substrate at the anchorages of the moving masses.

In this way, it is possible to prevent transmission of undesirable stresses from the micromechanical detection structure to the substrate and the package of the sensor device, thus solving the problems highlighted previously, amongst which: undesirable couplings between detection structures during electrical testing thereof; vibrations induced in the corresponding package following upon the driving movement; oscillations and instability of the zero level; and sensitivity to undesirable external stresses and vibrations that lead to rotational accelerations about the vertical axis z.

Even though both of the embodiments described previously have the same advantageous characteristics highlighted above, the first embodiment (FIG. 3) may, however, be more advantageous than the second embodiment (FIG. 5), at least in some circumstances, for example owing to the presence of a smaller number of moving masses, a better area occupation, a smaller number of elastic coupling elements, and a greater resulting simplicity of construction and greater insensitivity to manufacturing process spread.

In any case, as mentioned previously, it is advantageous to use the detection structure 20 in a MEMS sensor device.

Figure 7:
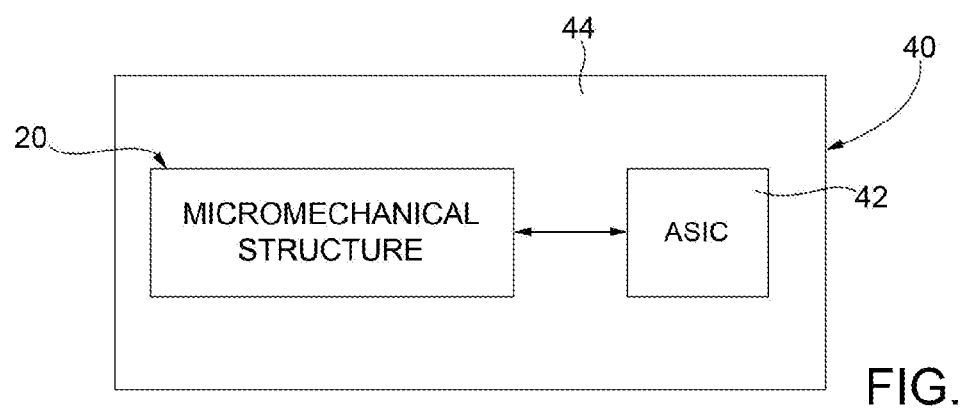
FIG. 7 is an overall block diagram of a MEMS sensor device including the micromechanical detection structure of FIG. 3 or 5 according to another embodiment of the present disclosure.

In this regard, FIG. 7 shows schematically a sensor device 40, for example a MEMS gyroscope, comprising the detection structure 20, designed to generate at least one electrical detection quantity as a function at least one quantity of interest (for example, an angular velocity, in the case of a gyroscope); and an electronic circuit 42 (a so-called ASIC—Application-Specific Integrated Circuit), electrically coupled to the detection structure 20 and designed to supply driving and biasing electrical quantities to the detection structure 20 and further designed to process the electrical quantities detected, for example by amplification and filtering operations.

In particular, the detection structure 20 and the electronic circuit 42 may be made in respective dies of semiconductor material, which are housed in a same package 44, for example in a configuration where they are arranged side-by-side or vertically stacked on top of one another.

FIGS. 8A-8C are top plan views of additional embodiments of the coupling units 14 and 34 of FIG. 5, each of which provides net zero forces and torques applied to the substrate 2 on which the detection structure 20 is formed. In FIG. 8A, a coupling unit 34a may be used in association with the first driven mass 10 or the second driven mass 30 in various embodiments of the detection structure 20. Whether utilized in association with the first or second driven masses 10 and 30, the coupling structure 34a is positioned within the aperture or empty space 32 in the center of each of the first and second driven masses. This empty space 32 is designated 32a in the embodiment of FIG. 8A. The coupling unit 34a includes two anchorage elements 37a that are spaced apart along the Y-axis direction and are attached to or formed as part of the substrate 2 on which the detection structure 20 including the coupling unit is formed. The driven mass 10, 30 (not shown) is elastically connected to the anchorage elements 37a, and thereby to the substrate 2, through a rigid connection structure 35a and an elastic connection structure 36a.

In the embodiment of FIG. 8A, the rigid connection structure 35a is connected to the driven mass 10, 30 through tab portions 35a-1 extending along the Y-axis and further includes an inner square portion 35a-2 connected to the tab portions. The inner square portion 35a-2 surrounds, in the XY plane, the anchorage elements 37a and the elastic connection structure 36a. The elastic connection structure 36a includes a first elastic portion 36a-1 extending along the X-axis direction and connected at each end to the inner square portion 35a-2. A second elastic portion 36a-2 extends along the Y-axis direction and connects each of the anchorage elements 37a to the first elastic portion 36a-1. In operation, the elastic connection structure 36a enables driving of the associated driven mass 10, 30 (not shown in FIG. 8A) in the driving direction and displacement of the driven mass in the direction of the apparent force, which is directly proportional to the angular velocity, as will be appreciated by those skilled in the art.

In the embodiment of FIG. 8B, a coupling unit 34b may be used in association with the first driven mass 10 or the second driven mass 30 in various embodiments of the detection structure 20. Once again, whether utilized in association with the first or second driven masses 10 and 30, the coupling structure 34b is positioned within the aperture or empty space 32b in the center of each of the first and second driven masses. The coupling unit 34b includes four anchorage elements 37b that are spaced apart along the X- and Y-axes and are attached to or formed as part of the substrate 2 on which the detection structure 20 including the coupling unit is formed. The driven mass 10, 30 (not shown) is elastically connected to the anchorage elements 37b, and thereby to the substrate 2, through a rigid connection structure 35b and an elastic connection structure 36b.

In the embodiment of FIG. 8B, the rigid connection structure 35b extends along the Y-axis direction and is connected at each end to the driven mass 10, 30, with two anchorage elements 37a being positioned to the left and two to the right of the rigid connection structure. The elastic connection structure 36b includes two first elastic portions 36b-1, one to the left of the rigid connection structure 36b and one to the right. Each first elastic portion 36b-1 extends along the Y-axis direction and is connected at each end to one of the adjacent anchorage elements 37b. The elastic connection structure 36b further includes two second elastic portions 36b-2, one to the left and one to the right of the rigid connection structure 35b. Each second elastic portion 36b-2 extends along the X-axis direction and connects at one end to one of the first elastic portions 36b-1 and at the other end to the rigid connection structure 35b. In operation, the elastic connection structure 36b enables driving of the associated driven mass 10, 30 (not shown in FIG. 8B) in the driving direction and displacement of the driven mass in the direction of the apparent force, which is directly proportional to the angular velocity.

The embodiment of FIG. 8C includes a coupling unit 34c that may be used in association with the first driven mass 10 or the second driven mass 30 in various embodiments of the detection structure 20. Once again, whether utilized in association with the first or second driven masses 10 and 30, the coupling structure 34c is positioned within the aperture or empty space 32c in the center of each of the first and second driven masses. The coupling unit 34c includes four anchorage elements 37c that are spaced apart along the X- and Y-axes and are attached to or formed as part of the substrate 2 on which the detection structure 20 including the coupling unit is formed. The driven mass 10, 30 (not shown) is elastically connected to the anchorage elements 37b, and thereby to the substrate 2, through a rigid connection structure 35c and an elastic connection structure 36c.

In the embodiment of FIG. 8C, the rigid connection structure 35c includes first and second rigid elements 35c-1 and 35c-2, each extending along the Y-axis direction and being spaced apart in the X-axis direction. Each of the first and second rigid elements 35c-1 and 35c-2 is connected at upper and lower ends to the driven mass 10, 30. The first and second rigid elements 35c-1, 35c-2 are positioned in the center of the empty space 32c, with two anchorage elements 37c being positioned to the left and two to the right of the first and second rigid elements. The elastic connection structure 36c includes two first elastic portions 36c-1, one to the left of the rigid connection structure 36c and one to the right. Each first elastic portion 36c-1 extends along the Y-axis direction and is connected at each end to one of the adjacent anchorage elements 37b. The elastic connection structure 36c further includes two second elastic portions 36c-2, one to the left and one to the right of the rigid connection structure 35c. Each second elastic portion 36c-2 extends along the X-axis direction and connects at one end to one of the first elastic portions 36c-1 and at the other end to one of the first and second rigid elements 35c-1 and 35c-2. Once again, in operation the elastic connection structure 36c enables driving of the associated driven mass 10, 30 (not shown in FIG. 8C) in the driving direction and displacement of the driven mass in the direction of the apparent force.

FIGS. 9A and 9b are top views of the driven masses 30 and 10, respectively, of FIG. 5 showing the positioning of electrodes E1, E2 beneath of each of the driven masses, as will now be described in more detail. The positioning of the electrodes E1, E2 for each axis depends on the orientation of the flexible or elastic structure associated with the driven mass 30, 10. In the embodiment of FIG. 9A, the coupling unit 34 formed by the rigid element 35, elastic connection elements 36 and anchorage elements 37 are arranged so that a roll (R) axis corresponds to the X-axis and the structure allows the detection of an angular velocity or rate acting on the Y-axis. In FIG. 9B, the coupling unit 14 formed by the rigid element 15, elastic connection elements 16 and anchorage elements 37 are arranged so that a pitch (P) axis corresponds to the Y-axis and the structure allows the detection of an angular velocity or rate acting on the X-axis. In the embodiments of FIGS. 9A and 9B, the electrodes E1, E2 are contained within the footprint or completely underneath each driven mass 10, 30, and are symmetric with respect to the center of rotation C of each driven mass.

Figure 10B:
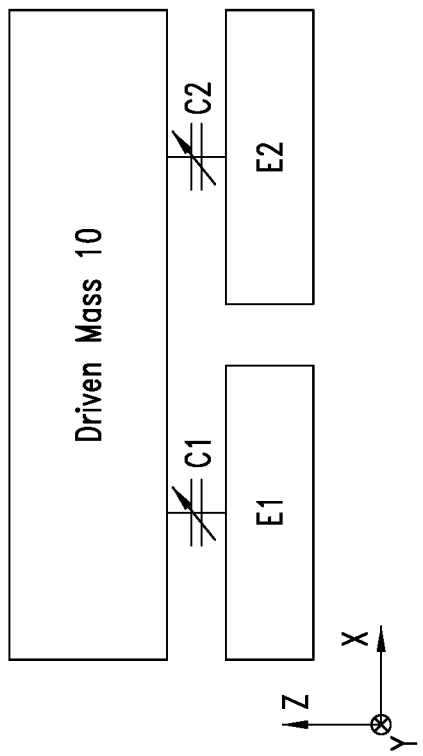
FIGS. 10A and 10B are simplified cross-sectional views illustrating variable capacitors formed by the first and second driven masses and the electrodes of FIGS. 9A and 9B.
Figure 10A:
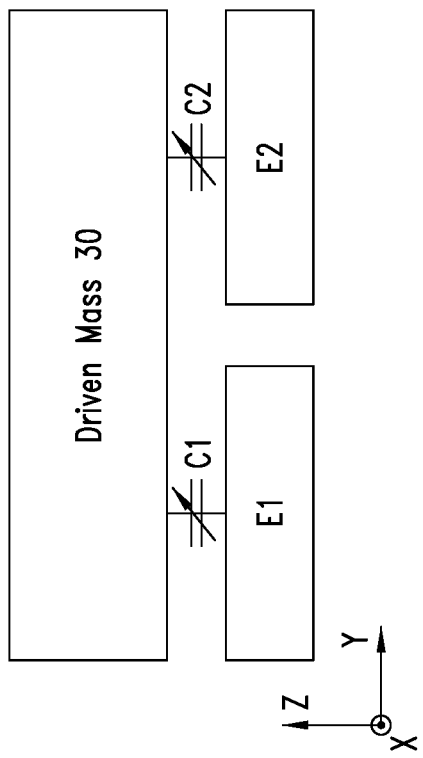

FIGS. 10A and 10B are simplified cross-sectional views illustrating variable capacitors C1, C2 formed by the driven masses 10, 30 and the electrodes E1, E2 of FIGS. 9A and 9B. Rotation about the roll axis R or X-axis in FIG. 10A results in changes in the values of the variable capacitors C1, C2, with one capacitor value increasing and the other decreasing, depending on the direction of rotation. The values of the capacitors C1, C2 indicate or allow for the detection of the angular velocity or rate acting on the Y-axis. Similarly, rotation about the pitch axis P or Y-axis in FIG. 10B results in changes in the values of the variable capacitors C1, C2, with one capacitor value increasing and the other decreasing, once again depending on the direction of rotation. The values of the capacitors C1, C2 indicate or allow for the detection of the angular velocity or rate acting on the X-axis.

Figure 11:
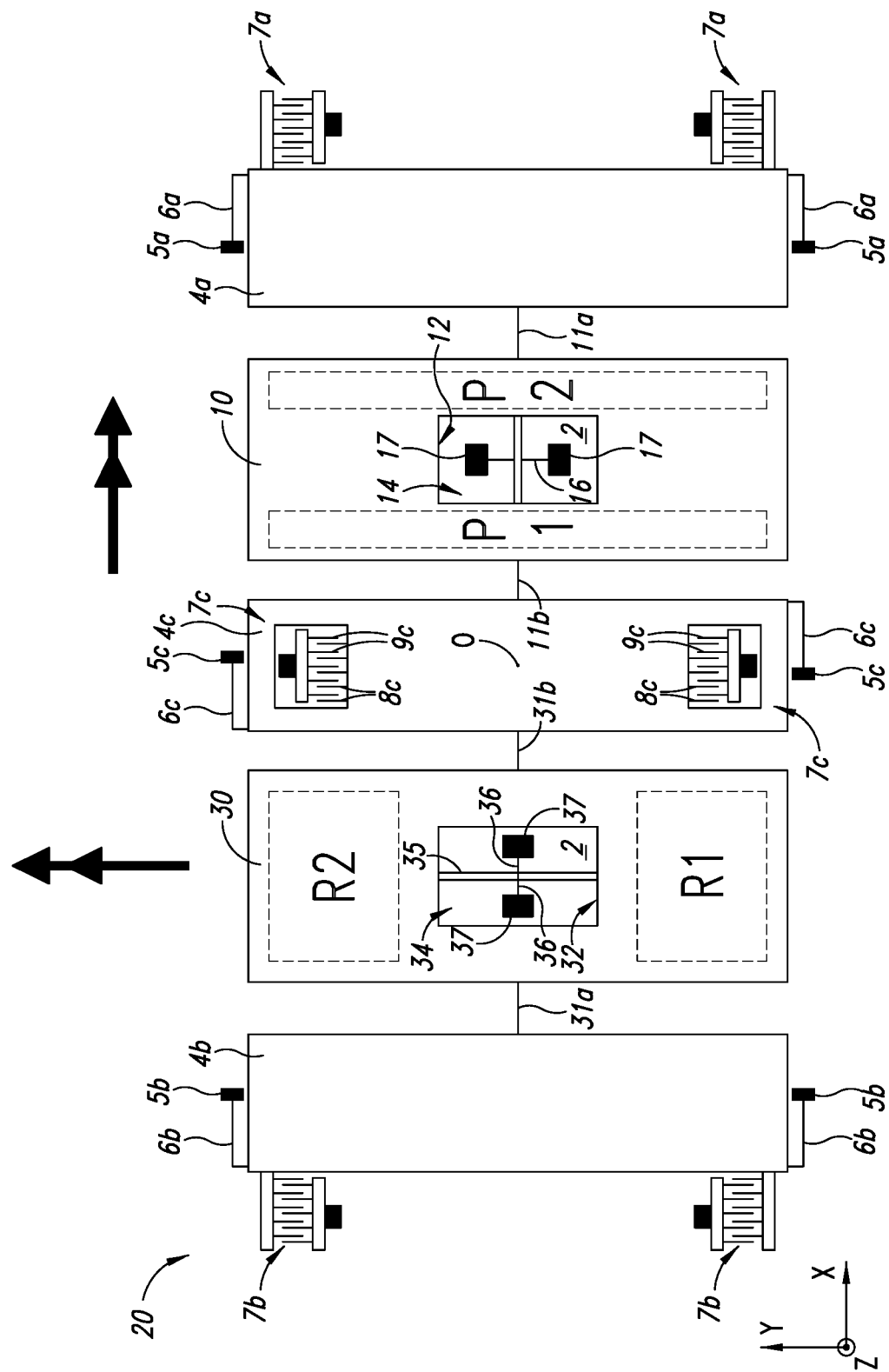
FIG. 11 is a schematic top plan view of the micromechanical detection structure of the MEMS sensor device of FIG. 5 showing the positioning of electrodes beneath the first and second driven masses according to one embodiment of the present disclosure.

FIG. 11 is a schematic top plan view of the micromechanical detection structure 20 of the MEMS sensor device of FIG. 5 showing the positioning of electrodes E1, E2 beneath each of the first and second driven masses 10, 30 according to one embodiment of the present disclosure. This figure illustrates the embodiments of the driven masses 10, 30 of FIGS. 9A and 9B contained within the detection structure 20. The electrodes E1, E2 associated with the driven mass 30 are associated with the roll axis R as discussed with reference to FIG. 9A and are thus indicated as R1 and R2 in FIG. 11. Similarly, the electrodes E1, E2 associated with the driven mass 10 are associated with the pitch axis P as discussed with reference to FIG. 9B and thus are indicated as P1 and P2 in FIG. 11. The detection structure 20 of FIG. 11 provides in-plane driving of the driven masses 10, 30 in that these masses are driven in the XY plane, and provides out-of-plane sensing since variations in the positions of these driven masses in the Z-direction are sensed.

Finally, it is clear that modifications and variations may be made to what has been described and illustrated herein, without thereby departing from the scope of the present solution, as defined in the annexed claims.

In this regard, it is emphasized once again that different embodiments may be envisaged, in addition to what has been illustrated previously by way of example, in which, in any case, the configuration and arrangement of the moving masses and of the corresponding elastic elements for coupling and anchorage to the substrate is such as to lead, following upon or in response to the appropriate driving movement, to a resultant force and a resultant twisting moment on the substrate that are substantially zero.

In particular, different kinematic arrangements of the moving masses, and different configurations of the corresponding elements for anchorage to the substrate, may be envisaged.

Furthermore, it is emphasized that the solution described may find advantageous application in bi-axial or tri-axial micromechanical detection structures, in MEMS gyroscopes, or also in different and further MEMS devices of an inertial type, in which it is desired to cancel out the resultant of the forces and torques acting on the substrate, or in any case to reduce them markedly, for example by at least a factor of ten.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a substrate;
   a driving mass elastically coupled to the substrate, the driving mass configured to be driven in a driving movement;
   a first driven mass elastically coupled to the driving mass, the first driven mass defining a first opening in a central region thereof;
   a first coupling assembly in the first opening of the first driven mass, the first coupling assembly including:
      a first rigid connection element having a first end connected to a first edge of the first driven mass in the first opening, and a second end connected to a second edge of the first driven mass in the first opening, the first and second edges facing one another across the first opening;
      a plurality of first anchorage elements within the first opening and coupled to the substrate; and
      at least one elastic connection element elastically connecting the first rigid connection element to the plurality of first anchorage elements;
   a second driven mass elastically coupled to the driving mass, the driving mass positioned between the first driven mass and the second driven mass, the second driven mass defining a second opening in a central region thereof; and
   a second coupling assembly in the second opening of the second driven mass, the second coupling assembly coupling the second driven mass to the substrate.

2. The device of claim 1 wherein the first rigid connection element has a first side between the first and second ends and a second side between the first and second ends, the first and second sides spaced apart from one another, and
   the at least one elastic connection element includes a first portion connected between the first and second sides of the first rigid connection element, the first portion extending along a first direction.

3. The device of claim 2 wherein the at least one elastic connection element includes a second portion extending along a second direction that is transverse to the first direction, the second portion connected between first and second first anchorage elements of the plurality of first anchorage elements.

4. The device of claim 1 wherein the first rigid connection element extends along a first direction between the first and second ends, and
   the at least one elastic connection element includes:
      a first elastic connection element having a first portion extending along the first direction between a first pair of the first anchorage elements, and a second portion extending along a second direction between the first portion of the first elastic connection element and the first rigid connection element, the second direction being transverse to the first direction; and
      a second elastic connection element having a first portion extending along the first direction between a second pair of the first anchorage elements, and a second portion extending along the second direction between the first portion of the second elastic connection element and the first rigid connection element.

5. The device of claim 1 wherein the first rigid connection element includes a first rigid element portion extending along a first direction between the first and second ends, and a second rigid element portion extending along the first direction between the first and second ends, the first and second rigid element portions spaced apart from one another along a second direction that is transverse to the first direction, and
   the at least one elastic connection element includes:
      a first elastic connection element having a first portion extending along the first direction between a first pair of the first anchorage elements, and a second portion extending along the second direction between the first portion of the first elastic connection element and the first rigid element portion; and
      a second elastic connection element having a first portion extending along the first direction between a second pair of the first anchorage elements, and a second portion extending along the second direction between the first portion of the second elastic connection element and the second rigid element portion.

6. The device of claim 1, further comprising:
   a first electrode between the substrate and the first driven mass; and
   a second electrode between the substrate and the first driven mass, the first and second electrodes spaced apart from one another along a first direction by the first opening of the first driven mass,
   wherein a first capacitance between the first electrode and the first driven mass varies in response to rotation of the first driven mass about a first axis extending in a second direction that is transverse to the first direction, and a second capacitance between the second electrode and the first driven mass varies in response to the rotation of the first driven mass about the first axis, and the first and second capacitances vary oppositely with respect to one another.

7. The device of claim 6 wherein the first and second electrodes are completely overlapped by the first driven mass.

8. The device of claim 6 wherein the first and second electrodes are spaced apart from the first axis by a same distance.

9. The device of claim 6, wherein the second coupling assembly includes:
- a second rigid connection element having a first end connected to a first edge of the second driven mass in the opening, and a second end connected to a second edge of the second driven mass in the opening, the first and second edges facing one another across the second opening;
- a plurality of second anchorage elements within the second opening; and
- at least one elastic connection element elastically connecting the second rigid connection element to the plurality of second anchorage elements.

10. The device of claim 9, further comprising:
- a third electrode between the substrate and the second driven mass; and
- a fourth electrode between the substrate and the second driven mass, the third and fourth electrodes spaced apart from one another along the second direction by the second opening of the second driven mass,
- wherein a third capacitance between the third electrode and the second driven mass varies in response to rotation of the second driven mass about a second axis extending in the first direction, and a fourth capacitance between the fourth electrode and the second driven mass varies in response to the rotation of the second driven mass about the second axis, and the third and fourth capacitances vary oppositely with respect to one another.

11. The device of claim 9 wherein the second rigid connection element from the first edge of the second driven mass to the second edge of the second driven mass in a direction that is transverse to a direction in which the first rigid connection elements extends from the first edge of the first driven mass to the second edge of the first driven mass.

12. The device of claim 9 wherein the device is a microelectromechanical systems (MEMS) detection structure, and the driving mass has a geometrical center located at a centroid and center of symmetry of the MEMS detection structure.

13. A MEMS sensor device, comprising:
- a micromechanical detection structure, including:
  - a substrate;
  - a first driving mass elastically coupled to the substrate, the first driving mass configured to be driven in a driving movement;
  - a first driven mass elastically coupled to the first driving mass, the first driven mass defining a first opening in a central region thereof;
  - a first coupling assembly in the first opening of the first driven mass, the coupling assembling including:
    - a first rigid connection element having a first end connected to a first edge of the first driven mass in the first opening, and a second end connected to a second edge of the first driven mass in the first opening, the first and second edges facing one another across the first opening;
    - a plurality of first anchorage elements within the first opening; and
    - at least one elastic connection element elastically connecting the first rigid connection element to the plurality of first anchorage elements;
  - a second driven mass elastically coupled to the driving mass, the driving mass positioned between the first driven mass and the second driven mass, the second driven mass defining a second opening in a central region thereof;
  - a second coupling assembly in the second opening of the second driven mass, the second coupling assembly coupling the second driven mass to the substrate; and
- an electronic circuit electrically coupled to the micromechanical detection structure and configured to supply electrical driving and biasing signals to the micromechanical detection structure and to process at least one electrical signal output by the micromechanical detection structure.

14. The MEMS sensor device of claim 13 wherein the micromechanical detection structure and the electronic circuit are integrated in respective semiconductor dies housed in a same package.

15. The MEMS sensor device of claim 13 wherein the micromechanical detection structure and the electronic circuit are configured to form a biaxial or triaxial MEMS gyroscope.

16. The MEMS sensor device of claim 13, wherein the second coupling assembly includes:
- a second rigid connection element having a first end connected to a first edge of the second driven mass in the opening, and a second end connected to a second edge of the second driven mass in the opening, the first and second edges facing one another across the second opening;
- a plurality of second anchorage elements within the second opening; and
- at least one elastic connection element elastically connecting the second rigid connection element to the plurality of second anchorage elements.

17. The MEMS sensor device of claim 16, further comprising:
- a second driving mass elastically coupled to the substrate and to the first driven mass, the first driven mass positioned between the first driving mass and the second driving mass; and
- a third driving mass elastically coupled to the substrate and to the second driven mass, the second driven mass positioned between the first driving mass and the third driving mass.

18. A method, comprising:
- forming a first coupling assembly in a first opening of a first driven mass, the first coupling assembly including a first rigid connection element having a first end connected to a first edge of the first driven mass in the first opening, and a second end connected to a second edge of the first driven mass in the first opening, the first and second edges facing one another across the first opening;
- elastically connecting the first rigid connection element to a plurality of first anchorage elements within the first opening, the first anchorage elements mechanically coupled to a substrate;
- elastically coupling a driving mass the substrate, the driving mass configured to be driven in a driving movement;
- forming a second coupling assembly in a second opening of a second driven mass, the second coupling assembly including a second rigid connection element having a first end connected to a first edge of the second driven mass in the second opening, and a second end connected to a second edge of the second driven mass in the second opening, the first and second edges facing one another across the second opening;
- elastically connecting the second rigid connection element to a plurality of second anchorage elements within the second opening, the second anchorage elements mechanically coupled to the substrate; and elastically coupling the second driven mass to the driving mass, the driving mass positioned between the first driven mass and the second driven mass.

19. The method of claim 18, further comprising:

elastically coupling a second driving mass to the substrate and to the first driven mass, the first driven mass positioned between the first driving mass and the second driving mass; and elastically coupling a third driving mass to the substrate and to the second driven mass, the second driven mass positioned between the first driving mass and the third driving mass.

20. The method of claim 18, further comprising:

forming a first electrode between the substrate and the first driven mass;

forming a second electrode between the substrate and the first driven mass, the first and second electrodes spaced apart from one another along a first direction by the first opening of the first driven mass;

forming a third electrode between the substrate and the second driven mass; and forming a fourth electrode between the substrate and the second driven mass, the third and fourth electrodes spaced apart from one another along a second direction by the second opening of the second driven mass, the second direction being transverse to the first direction.

* * * * *